(12) United States Patent
Gazi

(10) Patent No.: US 11,806,632 B2
(45) Date of Patent: Nov. 7, 2023

(54) EDUCATIONAL ELECTRONIC CIRCUIT BLOCK SET AND SIMULATION BOARD DISPLAYING ELECTRIC CURRENT FLOW

(71) Applicant: Asim Gazi, Arlington, TX (US)

(72) Inventor: Asim Gazi, Arlington, TX (US)

( * ) Notice: Subject to any disclaimer, the term of this patent is extended or adjusted under 35 U.S.C. 154(b) by 0 days.

(21) Appl. No.: 16/706,543

(22) Filed: Dec. 6, 2019

(65) Prior Publication Data

US 2023/0098617 A1     Mar. 30, 2023

(51) Int. Cl.
*G09B 23/18* (2006.01)
*A63F 3/04* (2006.01)
*A63F 3/00* (2006.01)
*G09B 9/00* (2006.01)

(52) U.S. Cl.
CPC ........ *A63F 3/0457* (2013.01); *A63F 3/00643* (2013.01); *G09B 9/00* (2013.01); *A63F 2003/00652* (2013.01); *A63F 2003/0471* (2013.01)

(58) Field of Classification Search
CPC ...... G09B 5/00; G09B 19/00; G09B 19/0069; G09B 23/18; G09B 23/183; G09B 23/185; A63H 33/042
See application file for complete search history.

(56) References Cited

U.S. PATENT DOCUMENTS

| | | | | |
|---|---|---|---|---|
| 3,078,596 A * | 2/1963 | Sweeton | ............... | G09B 23/185 439/78 |
| 3,175,304 A * | 3/1965 | Och | ............... | G09B 23/185 434/224 |
| 3,510,963 A * | 5/1970 | Boal | ............... | G09B 23/185 361/767 |
| 3,845,573 A * | 11/1974 | Kasamatsu | ............... | G09B 23/185 439/40 |
| 4,376,538 A * | 3/1983 | Keenan | ............... | A63F 3/00643 273/238 |
| 4,457,721 A * | 7/1984 | Charvolin | ............... | G09B 23/185 434/224 |
| 5,742,486 A * | 4/1998 | Yangkuai | ............... | G09B 23/185 361/811 |
| 6,910,894 B2 * | 6/2005 | Basconi | ............... | G09B 23/182 281/31 |
| 7,144,255 B2 * | 12/2006 | Seymour | ............... | H01R 13/627 434/118 |

(Continued)

*Primary Examiner* — Kurt Fernstrom
(74) *Attorney, Agent, or Firm* — Leavitt Eldredge Law Firm

(57) ABSTRACT

An educational game includes a controller and a computer to operate software; a game board, having a first transparent layer with slots arranged in a grid; a second layer housing a plurality of LEDs; a third layer housing the controller and computer; and an activation button; blocks to engage with the slots, each of the blocks having an encoding on a bottom surface; the blocks represent circuit elements and the slots represent electrically active slots for the circuit elements, thereby forming a circuit; the blocks allow a user to create a user modeled circuit; and the computer creates the user modeled circuit and analyzes the user modeled circuit to create a visualization feedback associated with the user modeled circuit, the visual feedback providing one or more unique LED patterns and one or more LED brightness variables to symbolize current flow and power intensity.

13 Claims, 4 Drawing Sheets

(56) References Cited

U.S. PATENT DOCUMENTS

| | | | | |
|---|---|---|---|---|
| 7,758,349 | B2 * | 7/2010 | Han | H05K 1/0286 |
| | | | | 439/39 |
| 8,272,876 | B2 * | 9/2012 | Schultz | H05K 1/16 |
| | | | | 439/38 |
| 9,153,145 | B2 * | 10/2015 | Valbuena | G09B 23/185 |
| 9,812,034 | B2 * | 11/2017 | Shim | G09B 23/185 |
| 10,490,103 | B1 * | 11/2019 | Bauer | H02G 3/123 |
| 10,636,317 | B2 * | 4/2020 | Metts | G09B 23/185 |
| 10,885,811 | B2 * | 1/2021 | Yeh | H05K 1/181 |
| 10,950,142 | B2 * | 3/2021 | Cummins | G09B 23/181 |
| 11,417,239 | B1 * | 8/2022 | Carter | G09B 23/183 |
| 2004/0096812 | A1 * | 5/2004 | Goh | G09B 23/185 |
| | | | | 434/379 |
| 2004/0229489 | A1 * | 11/2004 | Lu | G09B 23/181 |
| | | | | 439/214 |
| 2006/0246406 | A1 * | 11/2006 | Fu | G09B 23/18 |
| | | | | 434/301 |
| 2011/0070570 | A1 * | 3/2011 | Dunn | G09B 23/185 |
| | | | | 434/301 |
| 2015/0248846 | A1 * | 9/2015 | Kang | G09B 23/18 |
| | | | | 434/301 |

* cited by examiner

EDUCATIONAL ELECTRONIC CIRCUIT BLOCK SET AND SIMULATION BOARD DISPLAYING ELECTRIC CURRENT FLOW

BACKGROUND

1. Field of the Invention

The present invention relates generally to educational games, and more specifically to an educational game system that demonstrates basic circuit design principles to beginners. The system specifically allows for the demonstration of the current flow through a completed circuit diagram.

2. Description of Related Art

Educational games are well known in the art and are an effective means to combine both entertainment and fun with learning. However, there is currently a lack of educational games that adequately provide for educating students on electrical circuits, specifically regarding current flow. Traditionally, in schools, students are taught about current flow with resistors or lightbulbs; hoping students will develop the intuition that, for example, current and resistance are inversely related, open circuits disallow current flow, and short circuits can result in endangering safety hazards. With little to no emphasis on visualizing these abstract electrical concepts, however, students are left to speculate regarding the underlying fundamental mechanism of electricity: the flow of electric charge. To make matters worse, some schools do not integrate hands-on activities at all into the electricity learning process, leaving their students with little to no experience beyond circuit analysis via pencil and paper.

Multiple electrical kits are available for students to gain tactile experience outside of the classroom. These kits can help increase a student's interest; however, they may not be too instructive due to their inability to display current flow. At the end of building a circuit, a student may turn on a light bulb, light emitting diode (LED), or a fan—visual feedback that the circuit they built worked—but they may be left with little to no understanding of the current flow in the circuit. The problem remains. How can you relate current flow to different circuit elements? Answering this question are circuit simulators. Computer simulators allow a student to model a circuit on a computer and see a visual representation of the current in the given circuit. This provides great visual feedback on how current flows through a circuit, but the student is no longer afforded any physical manipulation of circuit elements on a board.

Accordingly, it is an object of the present invention to provide for an educational toy that bridges the instructive visualization of current flow and the kinesthetic learning process of physically interacting with and constructing a circuit. Unlike other circuit building kits, the model circuit, once built, is simulated, thereby facilitating a safe learning environment. In the present invention, there are no live circuits accessible to the user, as no power is passed through the circuit blocks on the board. Thus, students of all ages can use this educational toy without worrying about flawed construction of a circuit causing them harm.

SUMMARY OF THE INVENTION

The system of the present invention provides for an educational tool for practicing electronic circuit design. This system is designed to introduce electrical concepts such as resistance, current flow, open circuits, and short circuits to children at a young age. This invention is designed to minimize safety hazards for children; all the live circuits and wires are hidden from the user, so there is very minimal risk of shock. Furthermore, this invention is an interactive circuit simulation tool; children will utilize blocks that represent electrical elements such as resistors, diodes, LEDs, light bulbs, and a battery to build and simulate a circuit. Lastly, one of the main concepts and motivations behind this invention is visually representing current flow in a circuit. This visualization of current flow is achieved by leveraging LED strips.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
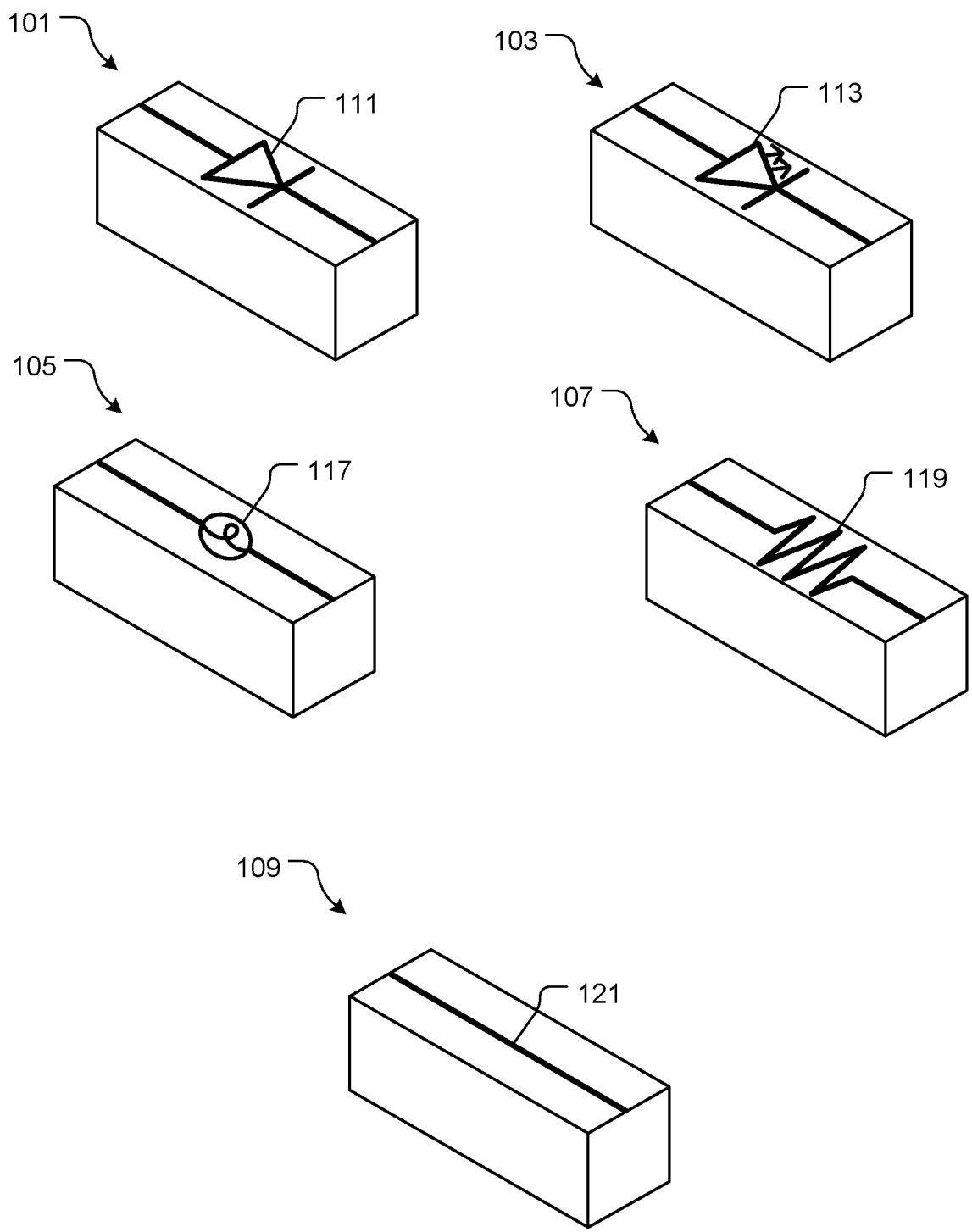
FIG. 1 depicts isometric views of a plurality of blocks as used with the educational game system of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional educational games and circuitry games. Specifically, the present invention provides for a unique and novel way to teach students about circuit design, including providing teaching on concepts such as current flow, resistance, open circuits, and short circuits. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

The system of the present invention will be discussed in reference to the Figures provided in more detail; however, for clarity, it should be appreciated that the system includes essentially a game board with a controller and computer, and a plurality of blocks that engage with the game board to allow a user to create a modeled circuit. The board itself will house the inner workings of the invention, while the plurality of blocks provide an avenue for user interaction with the invention.

As will be discussed in more detail, the blocks represent circuit elements and the accessible areas of the board represent electrically active slots where circuit elements can be connected to fixed nodes and a fixed battery to form a circuit.

Figure 2:
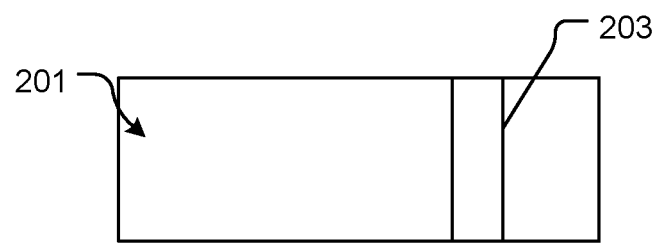
FIG. 2 is a bottom view of a block with encoding in accordance with the system of the present application.

In FIG. 1, isometric views of a plurality of blocks 101, 103, 105, 107, 109 as part of the system of the present invention are shown. The plurality of blocks in the preferred embodiment are rectangular prisms, however, it should be appreciated that various size, dimensions, and shapes could be used. As shown, each of the plurality of blocks includes a symbol 111, 113, 115, 117, 119, 121 which provides for identification of each block. In the preferred embodiment, each symbol is analogous to a real-world circuit diagram. Further, as shown in FIG. 2, the bottom 201 of each of the plurality of blocks includes an encoding 203 that is configured to be read by one or more sensors on the board, as will be discussed in more detail herein. This encoding provides information to be read by one or more sensors and interpreted by the computer and associated software. The encoding may be in various positions on the bottom of each of the plurality of blocks. The blocks are made of transparent material, such as acrylic, to allow for light to pass through them.

Another unique feature believed characteristic of the present invention is a combination of features that provide for an improved educational game, namely the board and blocks that enable tactile interaction with the game; the absence of any electrical components (resistors, wires, diodes, etc.) within the blocks or in the slots where users place the blocks into, thereby limiting circuitry accessible to the user; and the visualization of current flow through the use of LEDs being displayed through a clear top layer and clear blocks.

Figure 3:
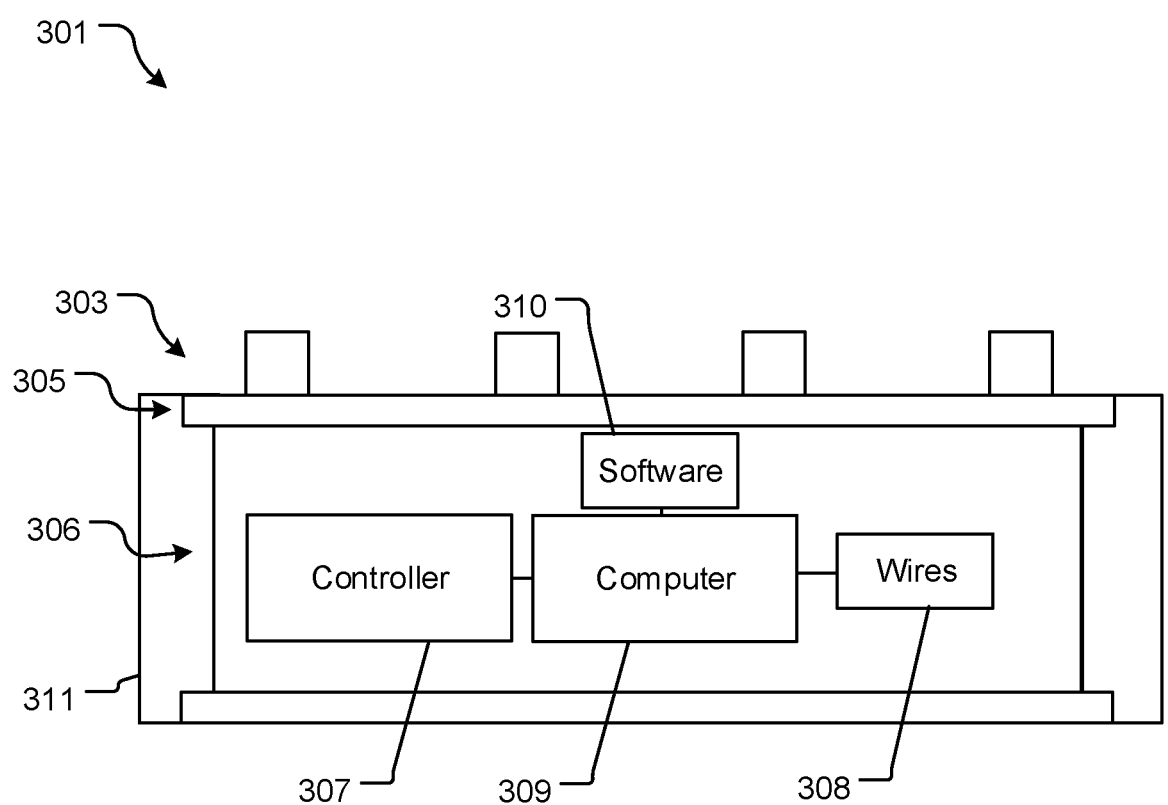
FIG. 3 is a simplified side view of a game board of the educational game system of the present application.

In FIG. 3, a simplified side view depicts the configuration of a game board 301 in accordance with a preferred embodiment of the present application. The game board 301 includes a first transparent layer 303, a second layer 305 housing a plurality of LED strips, and a third layer 306 housing a controller 307, a computer 309 with associated software 310, and a plurality of wires 308. The gameboard can further include a wooden frame 311 in some embodiments. The wooden outer frame may vary, and in some embodiments is made up of a base, sides and upper layer that provide the necessary support for the rest of the invention. The space between the base and the upper layer allows for the electrical components to be housed inside to avoid any user contact with circuit elements. The sides are present to secure the inner workings of the invention in order to prevent unwanted user interaction with the physical circuitry within.

The board is responsible for the computation and physical space necessary for the design and simulation of the user modeled circuit, eventually culminating in an LED display representing current flow through the user modeled circuit.

Figure 4:
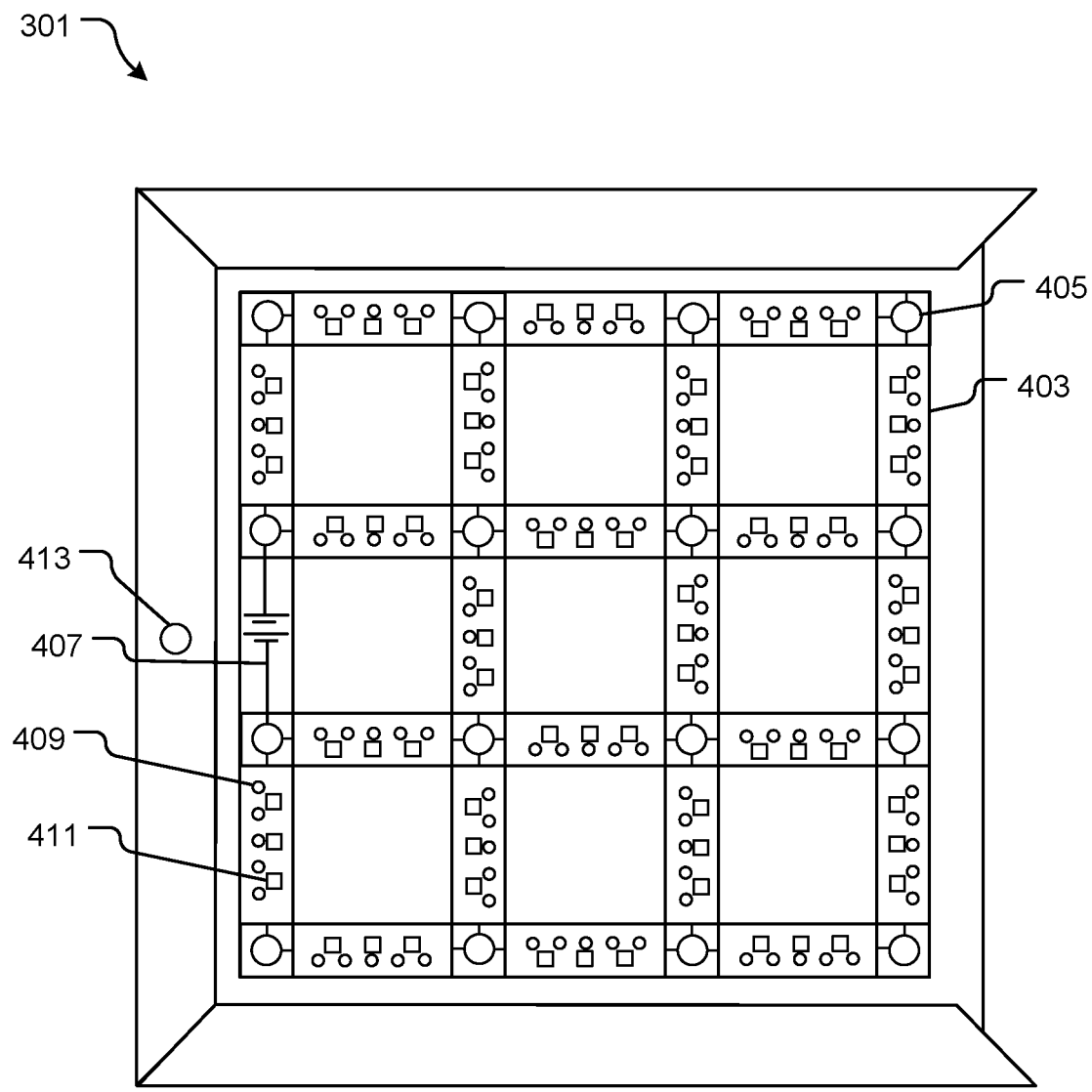
FIG. 4 is a top view of the game board of FIG. 3.

In FIG. 4 a top view of the game board 301 is shown. As shown, the top is separated into a grid configuration, such as a 4×4 grid. Further shown in this figure are a plurality of slots 403 positioned between nodes 405 affixed to the board. As shown, the nodes 405 will be fixed to the board in a 4×4 arrangement, wherein each node consists of a circular node symbol and a short connection to the block slots. The board further includes a battery block 407. It should be appreciated that in the preferred embodiment, both nodes and battery blocks are made of the same material as the rest of the blocks. A plurality of sensors 411 and a plurality of LEDs 409 are further incorporated therein. An activation button 413 is further included with the board.

In the preferred embodiment, each slot has 3 sensors (as shown). This three-sensor arrangement allows for 8 different encoding and decoding possibilities per slot, i.e., 8 different circuit element possibilities in our case. To include more, drill more holes and add additional sensors. To delimit the slots, acrylic nodes are attached to the board to not only improve the aesthetically pleasing nature and functionality of the board's top layer, but to also provide for a top view reminiscent of a circuit diagram designed on paper.

The LEDs are present to display illumination patterns corresponding to current flow in the user modeled circuit. In addition, the system is configured to provide visualization of power intensity. This visualization is created through varying intensities of brightness of the LEDs. The sensors are present to provide the necessary digital input to the computer in order for the software to decode the information provided from the circuit.

It should be appreciated that the size of the board can vary, for example, the board can be in a 2×2 node arrangement, a 3×3 node arrangement, or other variable arrangements, that may be either square or non-square.

Within the board are housed the controller, computer, and other circuitry. The computer is responsible for implementing the software. Overall, the software on the computer leverages the sensors to sense the encoding present on the blocks, converts that information into block types, corresponding to circuit element types, and positions on the board, corresponding to nodes to which the circuit element is connected to, thereby creating a netlist and simulating the corresponding circuit. The encoding and decoding of blocks also allow for illuminated components, such as light bulbs and LEDs, to be tracked. The software then reads in each slot's current value from the circuit simulation output, quantizes the ampere values into a discrete set of current intensity "levels," and saves the presence of a negative sign to communicate current direction. It also saves the presence of illuminated components. The final piece of information stored in this section of software is whether or not there is a short circuit, i.e., the intensity of current crosses an upper bound. This information is saved in one bit (short circuit or not a short circuit). This information is then compiled into one string and communicated serially via USB to the microcontroller. On the microcontroller side, the digitally addressable aspect of the LED strips is leveraged. Within each slot, the corresponding LED addresses need to be taken into consideration. With that in mind, each of the slots' current intensity, current direction, and presence of an illuminated component all correspond to a specific set of LEDs. That said, the software reads in the serially transmitted string of information, parses it according to corresponding slot on the board, and then illuminates the LEDs to display current intensity and direction, along with the presence of any illuminated component. More specifically, to display direction, the LEDs within a specific slot are illuminated sequentially, i.e., if there are 5 LEDs within a slot, then the first one would turn on with the others off. Then, the second would turn on with the rest off, and so on. This displays a seemingly directed "flow" of LED lights. This feature is believed to be successful in communicating current direction. Moreover, to display intensity, either the magnitude of LED intensity can be altered or the speed of the aforementioned LED pattern can be varied. As described in our preferred embodiment section, the latter is chosen. The above software functionality is only executed once a user presses the simulate button, so that condition is checked in an infinite loop once the board is turned on, and that acts as the final block of software functionality.

Figure 5:
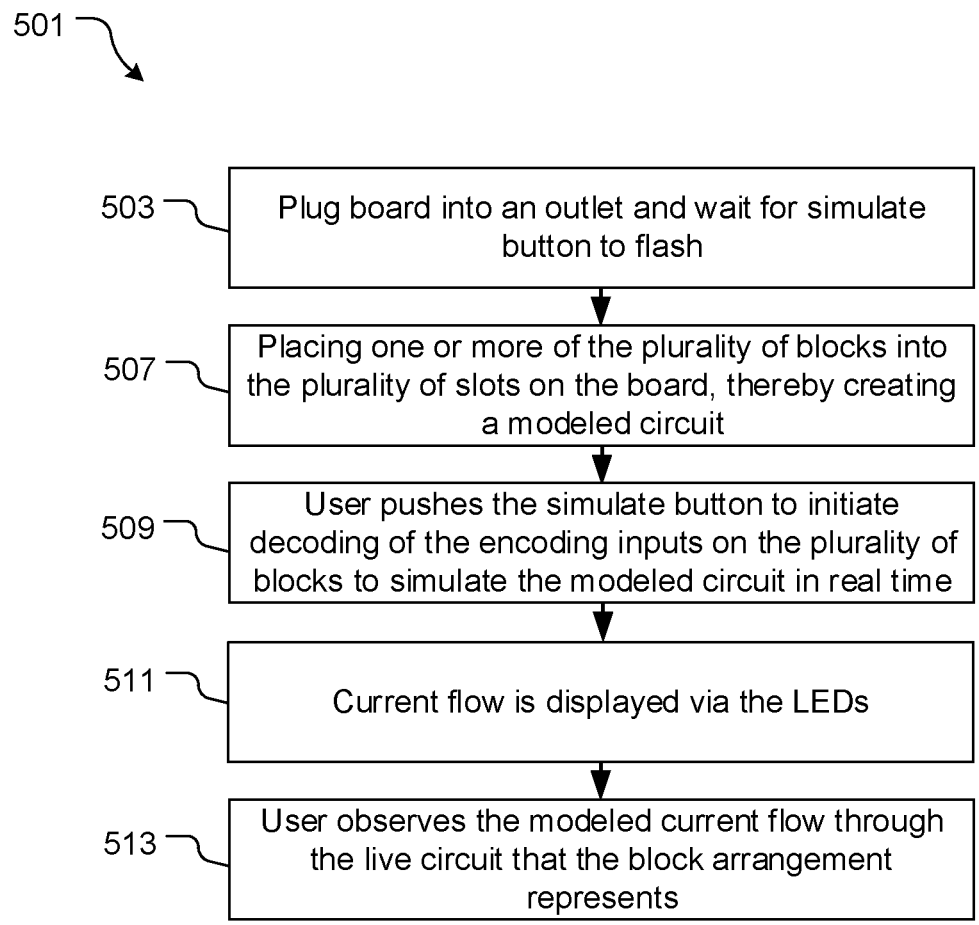
FIG. 5 is a flowchart of the method of operation of the system of the present invention.

In FIG. 5, a flowchart 501 depicts a method of operation of the system of the present invention. The user will plug the board into an outlet and wait for the simulate button to flash, which indicates that the computer and controller have booted and are ready to be used, as shown with box 503. The user will then place one or more of the plurality of blocks into the plurality of slots on the board, and arrange the plurality of blocks as desired to create a modeled circuit, as shown with box 507.

Once the user is finished modeling the live circuit they wish to visualize current flow for, the user will press the button which will initiate the decoding of the encoding inputs on the plurality of blocks and communicate the necessary LED driving information to the controller to cause an LED ring to illuminate and signify the circuit has been simulated and the output can now be observed, as shown with box 509. The current flow through the circuit will then be displayed via the LEDs, as shown with box 511. It should be appreciated and understood that the LEDs will be visible under the top transparent layer and further through the plurality of blocks which are clear.

The user can then observe the mathematically modeled current flow through the live circuit their block arrangement represents via the LEDs, as shown with box 513.

It should further be appreciated and understood that system can be configured to display magnitude through varying the LED pattern speed. To display direction, the LED pattern will be directed towards the direction of positive charge flow in the circuit. If any illuminated components are placed within the circuit, the center LED under the corresponding slot will illuminate a different color, signifying that the user-placed illuminated component has been provided enough current flow to light up. Note that current flow will still be displayed simultaneously under the illuminated component as well, thereby educating the user on electrical current flow and its relationship to "turning on" illuminated components, such as light bulbs.

The system of the present invention utilizes wiring that can be implemented through those with knowledge in the art.

It should be appreciated that one of the unique features believed characteristic of the present application is that all of this education is accomplished completely free of any accessible live circuits. This feature is important in the case where a user may not realize, for example, that they designed a circuit that contains a short circuit loop within it. Utilizing actual circuit elements, as many previous inventions have done, this can actually pose a hazard to the user. In this invention's case, the board will simply flash bright red to signify this hazardous circuit design. This safety aspect (considering the target population of children and youth), along with the additional novel features of this invention described throughout this document, clearly set this educational circuit simulation board apart from prior art.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An educational game, comprising:
   a controller and a computer to operate software;
   a game board, having:
      a first transparent layer having a plurality of slots arranged in a grid;
      a second layer housing a plurality of LEDs and one or more sensors;
      a third layer housing the controller and computer; and
      an activation button;
   a plurality of blocks configured to engage with the plurality of slots, each of the plurality of blocks having an encoding on a bottom surface;
   wherein the plurality of blocks represent circuit elements and the plurality of slots represent electrically active slots for the circuit elements to engage therewith, thereby forming a circuit;
   wherein the plurality of blocks allow a user to create a user modeled circuit; and
   wherein the software receives information from the user modeled circuit based on the encoding of each of the plurality of blocks;
   wherein the computer creates the user modeled circuit and analyzes the user modeled circuit to create a visualization feedback associated with the user modeled circuit, the visual feedback providing one or more unique LED patterns and one or more LED brightness variables to symbolize current flow and power intensity.

2. The game of claim 1, wherein the plurality of blocks each comprise a symbol on a top face.

3. The game of claim 2, wherein the symbol is analogous to a real-world circuit diagram.

4. The game of claim 1, further comprising:
a wooden frame surrounding and supporting the game board.

5. The game of claim 1, wherein the second layer further comprises:
one or more optical sensors configured to communicate with the computer.

6. The game of claim 1, wherein the plurality of blocks are composed of acrylic.

7. The game of claim 1, wherein the plurality of slots are arranged in a 4×4 grid configuration.

8. The game of claim 1, wherein the visualization of the corresponding circuit includes visual feedback for current flow and power intensity based on positioning of the plurality of blocks.

9. The game of claim 1, wherein the plurality of blocks are transparent and allow for light to pass therethrough for visual feedback.

10. The game of claim 1, wherein the controller, the computer, and one or more wires are housed under the first transparent layer and within a non-conductive enclosure.

11. The game of claim 1, wherein the visualization feedback includes variable light intensity associated with the plurality of LEDs, the variable light intensity being proportional to power magnitude throughout the user modeled circuit.

12. The game of claim 1, wherein the visualization feedback includes variable speed patterns of illumination of the plurality of LEDs, the variable speed of illumination being proportional to current magnitude in the user modeled circuit.

13. A method of operating an educational game, the method comprising:
providing a game board having a first transparent layer having a plurality of slots arranged in a grid, a second layer housing a plurality of LEDs and one or more sensors, and a third layer housing a controller and a computer; and an activation button;
providing a plurality of blocks having an encoding on the bottom surface;
engaging one or more of the plurality of blocks on the game board, wherein the one or more of the plurality of blocks engage with the plurality of slots, thereby creating a user modeled circuit; and
pressing the activation button; and
wherein activation causes a visualization of current flow through the user modeled circuit for user observation.

* * * * *